Patented Aug. 8, 1950

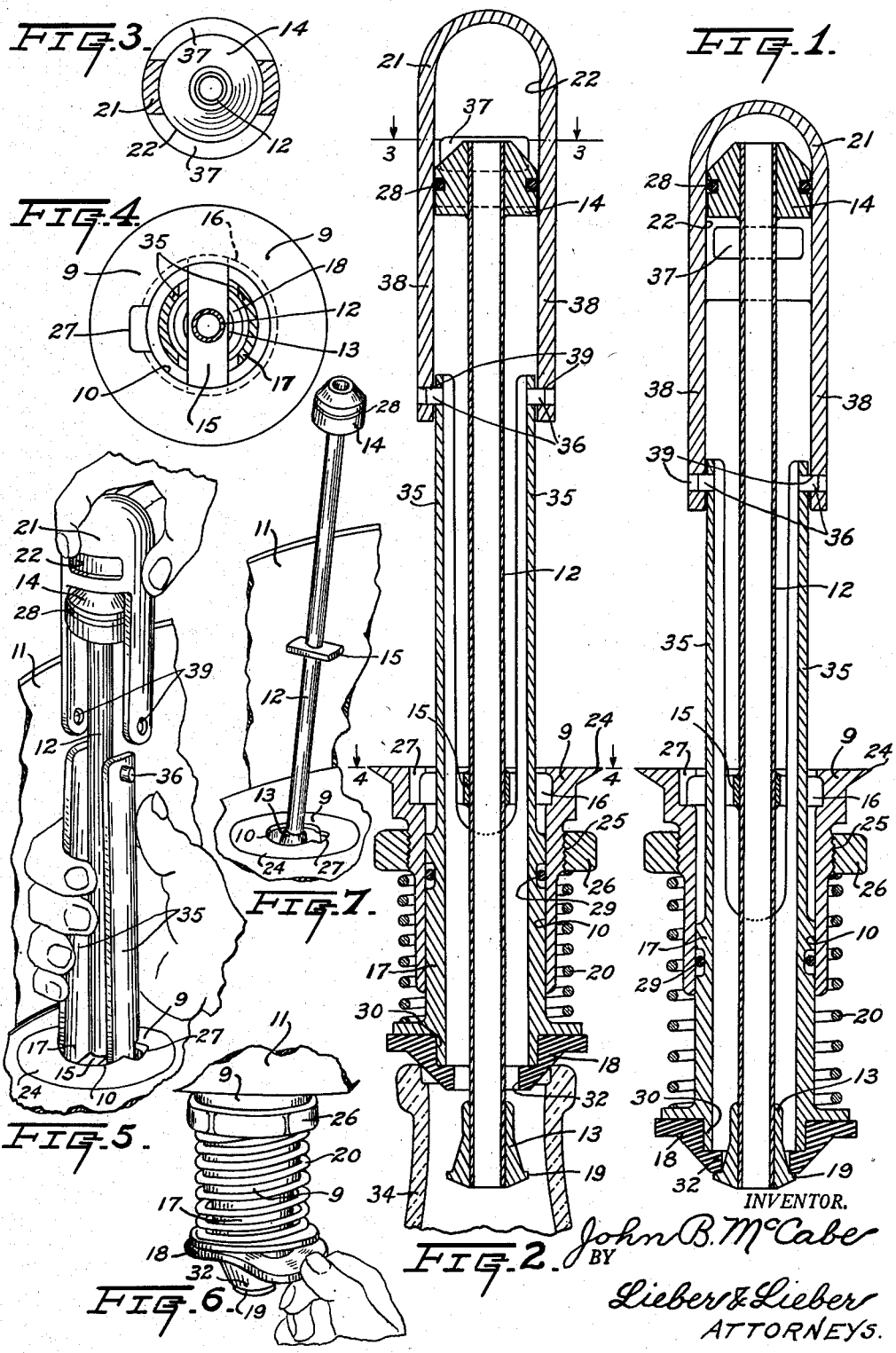

2,518,349

UNITED STATES PATENT OFFICE 2,518,349

RECEPTACLE OPERATED FILLING VALVE WITH VENT CUTOFF

John B. McCabe, Milwaukee, Wis., assignor to Federal Manufacturing Co., Milwaukee, Wis., a corporation of Wisconsin Application January 10, 1947, Serial No. 721,312

16 Claims. (Cl. 226—123)

1

This invention relates in general to improvements in the art of dispensing liquids, and relates more specifically to improvements in the construction and operation of apparatus for supplying batches of milk or similar liquid to successive receptacles such as bottles.

The primary object of my invention is to provide an improved liquid dispensing device which is simple in construction and highly efficient in operation.

Various types of dispensing nozzles or valves for effecting delivery of batches of liquid such as milk to successive receptacles such as bottles travelling along a definite path, have heretofore been proposed and used commercially, but most of these prior devices are objectionable for diverse reasons. A fundamental requirement in such equipment for handling milk and cream, is that it be susceptible of being maintained in highly sanitary condition, free from filth and fat accumulating pockets and corners and capable of being readily dismantled and thoroughly cleaned. Another important requirement is that devices of this type should gradually deliver equal batches of the milk to each of the successive receptacles while permitting free escape of air from within the bottles, in order to insure uniform and accurate filling. Still another requirement is that the liquid injection valves should function rapidly and without danger of clogging, and that they eliminate undesirable delay in operation of the machines with which they are associated. None of the prior apparatus of this type is capable of meeting all of these requirements, and many of the previous liquid filler valves are also complicated in structure and costly to manufacture and difficult to install.

It is therefore a more specific object of the present invention to provide an improved milk and cream dispensing nozzle which effectively meets all of the above mentioned requirements in a most effective manner, and which is also of simplified construction and capable of being manufactured and sold at moderate cost.

Another specific object of the invention is to provide an improved liquid food dispensing valve which may be readily maintained in highly sanitary condition, and all parts of which are conveniently accessible for inspection and thorough cleansing.

A further specific object of this invention is to provide an improved device for delivering equal liquid batches to each of the successive receptacles in a most effective manner, while permitting free escape of air and other gases from within the receptacles being filled.

Still another specific object of my invention is to provide improved liquid injection apparatus which is operable by rapidly advancing receptacles, and which is highly dependable and accurate in operation while requiring minimum attention.

An additional specific object of the present invention is to provide an improved liquid dispensing nozzle which is adapted to be readily applied as a unit for diverse uses, and which is free from clogging even when operating with heavy or greasy fluids.

These and other specific objects and advantages of the invention will be apparent from the following detailed description.

A clear conception of the features constituting my present improvement, and of the mode of constructing and utilizing receptacle filling apparatus embodying the invention, may be had by referring to the drawing accompanying and forming a part of this specification wherein like reference characters designate the same or similar parts in the various views.

Fig. 1 is a central vertical section through a typical milk filler nozzle assemblage showing the parts in normal or inactive position;

Fig. 2 is another central vertical section through the same assemblage, but showing the parts in filling or active position;

Fig. 3 is a transverse section through the nozzle, taken along the line 3—3 of Fig. 2;

Fig. 4 is another transverse section through the improved valve or nozzle unit, taken along the line 4—4 of Fig. 2;

Fig. 5 is a perspective view of the upper portion of one of the valve units, depicting the first step of dismantling;

Fig. 6 is another perspective view of the valve assembly, illustrating the second dismantling step; and Fig. 7 is still another perspective view of the assemblage, showing the third or final dismantling step.

While the invention has been shown and described herein as having been embodied in a typical filler valve or nozzle especially adapted to handle fresh milk, butter milk, cream or the like, it is not my desire or intention to unnecessarily restrict the scope or utility of the improved features by virtue of this limited disclosure and specific terms employed herein should therefore be given the broadest possible interpretation consistent with the disclosures.

Referring to the drawing, the typical improved milk dispensing nozzle unit shown therein, comprises in general a normally fixed annular upright casing 9 having a central bore 10 and adapted to be firmly suspended from the bottom of a tank 11 having therein a liquid supply basin in open communication with the bore 10; a normally stationary upright vent tube 12 having a lower end head 13 and an upper end piston 14, the tube 12 being fixedly mounted centrally of the casing 9 by means of a transverse retainer plate 15 coacting with an annular recess 16 at the upper end of the bore 10; a tubular sealing member 17 slidably engaging the casing bore 10 and having a flexible actuating and retaining disc 18 secured to its lower end and which coacts with a flange 19 of the lower head 13; resilient means such as a helical compression spring 20 interposed externally between the casing 9 and member 17 for constantly urging the retaining disc 18 toward the end head flange 19; and a cylinder 21 detachably secured to the upper extremity of the member 17 and having a bore 22 with which the upper piston 14 is snugly cooperable.

All parts of each nozzle or valve unit should preferably be formed of rust-proof material, and each casing 9 is provided with an integral upper flange 24 adapted to engage and to lie flush with the bottom of the tank 11, and is also provided with external screw threads 25 which are cooperable with a clamping ring nut 26 to firmly secure the casing 9 to the tank 11, see Figs. 1, 2 and 6. The fixed vent tube 12 is maintained centrally of the casing 7 by the retainer plate 15 when in engagement with the casing recess 16, but this recess is provided with a local enlargement or slot 27 through which the plate 15 may be passed during assembly and dismantling. The plate 15, lower head 13, and upper piston may be firmly attached to the straight elongated vent tube 12 by soldering, brazing, welding, or otherwise, and the tube 15 should be of sufficient height so that its upper extremity will be above the liquid level in the tank 11 at all times. The lower head 13 has the flange 19 formed integral therewith, and the external diameter of this flange 19 is slightly less than the internal bore of the sealing member 17; and the upper piston 14 is provided with a packing ring 28 and preferably has a frustro-conical upper surface, as shown.

The vertically movable tubular sealing member 17 is snugly but slidably fitted within the casing bore 10, and is provided with a groove having therein a sealing ring 29 which coacts with the bore 10; and the flexible disc 18 is preferably formed of rubber or the like, and snugly embraces an annular projection 30 formed integral with the lower end of the member 17. While the rubber disc 18 is normally fastened to and moves with the member 17, it may be readily removed from this member for cleaning and replacement purposes, and the disc 18 is provided with an internal lower lip or flange 32 which surrounds the fixed head 13 and normally contacts the plug flange 19 as shown in Fig. 1. This disc lip or flange 32 is constantly urged toward the flange 19 of the fixed head 13 by the helical spring 20 which is interposed between the casing 9 and the member 17; but the flexible flange 32 while normally arresting the downward motion of the member 17, may be forcibly distorted and removed over the periphery of the stationary head 13 so as to permit free downward removal of the member 17 and spring 20. The frustro-conical or tapered formation of the head 13 permits ready assembly of the unit, and the lower portion of the disc 18 is tapered so as to fit and seal bottles 34 or other receptacles having openings of different diameters. It will be noted from the foregoing description, that each of the rubber discs 18 performs triple functions, namely, sealing the bottle top opening, seating against the vent tube tip or head 13, and acting as a retainer for holding the sleeve member 17 and spring 20 in proper position upon the tubular fixed casing 9.

The movable sleeve member 17 is provided with a pair of elongated diametrically opposite resilient integral extensions or arms 35 which project upwardly into the supply tank 11, and are provided with outwardly extending alined pins 36 at their upper extremities. The cylinder 21 with which the fixed piston 14 cooperates to provide a vacuum pump, is provided with opposite side slots or ports 37 connecting the cylinder bore 22 with the outside air above the level of the liquid in the tank 11; and the upper extremity of the cylinder 21 is sealed by an integral closure while its lower extremity is provided with opposite stiff integral ears 38 having alined openings 39 therein adapted to snugly receive the pins 36 of the resilient arms 35 when the unit is assembled and ready for use, as illustrated in Figs. 1 and 2. The pins 36 may however be readily removed from within the openings 39 so as to release the cylinder 21 for free upward withdrawal from the fixed piston 14, by merely pressing the resilient arms 35 inwardly toward the vent tube 12, and the cylinder 21 normally moves up and down with its supporting sleeve member 17.

During normal operation and use of the improved receptacle filling apparatus, any desired number of the dispensing units may be associated with a common tank 11 to which milk may be supplied in any convenient manner so as to maintain a liquid basin having a level which is constantly beneath the tops of the vent tubes 12 and cylinder ports 37. The successive empty receptacles or bottles 34 may then be elevated concentrically of the vent tube 12 of each nozzle unit to cause the upper end of the bottles 34 to engage the adjacent discs 18 and to move the corresponding sleeve members 17 away from the plug head 13 as shown in Fig. 2. During this upward movement of each disc 18 and member 17, the corresponding spring 20 will be compressed, and the sealing ring 29 slides along the adjacent casing bore 10 while the corresponding lip flange 32 moves upwardly away from the adjacent fixed flange 19. The initial upward motion of the disc 18 does not expose the vent openings 37 of the pump cylinder 21 thus causing the sealed piston 14 to produce a momentary vacuum within the upper end of the cylinder 22 and clearing the interior of the vent tube 12 for subsequent free escape of air; and as the cylinder 21 continues to rise, the ports 37 are exposed or opened and air is then free to escape from the bottle 34 through the tube 12 and cylinder 21 to the atmosphere.

Liquid from within the tank 11 will then flow by gravity through the interior of the valve member 17 and through the disc 18 past the head 13 into the bottle 34 until the latter has been properly filled. Excess liquid is then permitted to rise in the vent tube 12 until it reaches the same level as that of the liquid in the tank 11, whereupon the commodity laden bottle will be lowered so as to release the spring 20. This spring 20 thereafter becomes promptly effective to force the sleeve member 17 and the valve disc 18 downwardly, and the descending member 17 simultaneously causes the cylinder 21 carried thereby to descend along the adjacent fixed piston 14. The initial downward motion of the pump cylinder 21 closes the ports 37, and continued movement of the cylinder causes the fixed piston 14 to force a predetermined quantity of liquid out of the vent tube 12. Surplus liquid in the vent tube, varying in accordance with the liquid level in the tank 11, is retained within the tube 12 by virtue of the sealed chamber at the upper end of the cylinder 21 which causes atmospheric pressure acting upon the lower end of the liquid column to prevent further escape of the liquid.

Each of the successive bottles 34 will thus be supplied with an equal batch of liquid from the supply tank 11, and when it becomes desirable to dismantle one of the improved units for inspection and cleaning purposes, this may be done by performing the steps depicted in Figs. 5, 6 and 7. The cylinder 21 may be freely vertically removed from the piston 14 by merely pressing the resilient arms 35 of the member 17 inwardly until the pins 36 have been withdrawn from the openings 39, as shown in Fig. 5; and the rubber retainer disc 18 may be stretched and pulled over the flange 19 of the fixed head 13, as shown in Fig. 6, thereby releasing the member 17 and permitting the same to be removed downwardly from within the casing bore 10. After the member 17 has been thus withdrawn, the spring 20 may be freely removed; and the vent tube 12 with its associated parts, may be finally released by twisting the same so as to bring the locking plate 15 in alinement with the notch 27 of the casing 9 and by thereafter slightly tilting the tube 12 and lifting its lower end and the head 13 out of the main casing, as depicted in Fig. 7. These several steps may be quickly and conveniently performed, and the dismantled valve unit may be just as readily reassembled by merely reversing the several operations.

From the foregoing detailed description it will be apparent that the present invention provides an improved liquid dispensing unit which besides being simple, compact and durable in construction, is highly efficient in operation and easily cleanable. The rubber disc 18 and seal rings 28, 29 eliminate excessive wear while also preventing undesirable leakage, and the assemblage is devoid of corners in which solids might accumulate and is constructed for smooth injection of uniform batches of the liquid into the successive bottles 34 with minimum agitation. By utilizing the vacuum pump comprising the piston 14 and cylinder 21, at the upper end of the vent tube 12, clogging of the vent passage is effectively prevented and undesirable dripping of liquid from within the passage after each bottle 34 is removed is also avoided; and the rubber disc 18 besides providing an effective seal at the top of each bottle 34, also facilitates assembly and dismantling of the unit, and coacts with the head 13 to close the valve. The various parts of the improved dispensing valve may be readily manufactured at moderate cost, and the units have proven highly satisfactory and successful in actual use, especially when operating with relatively fatty liquids such as cream and milk.

It should be understood that it is not desired to limit this invention to the exact details of construction or to the precise mode of operation, herein shown and described, for various modifications within the scope of the appended claims may occur to persons skilled in the art.

I claim:

1. Receptacle filling apparatus comprising, a fixed casing having an upright bore communicable with a liquid supply basin, a fixed upright elongated tube mounted centrally of said bore and having a vent passage extending from its lower portion upwardly through said casing and above the liquid in said basin, an end head secured to the lower extremity of said tube and having an outwardly projecting flange, a tubular sealing member slidably coacting with said bore and having thereon a releasable inwardly extending flange normally engageable with said outwardly projecting flange to prevent escape of liquid from said basin, said inwardly extending flange being removable from said member over said outwardly projecting flange to release the member for removal from said casing bore and said member being thus removable only after such removal of the member flange.

2. Receptacle filling apparatus comprising, a fixed casing having an upright bore communicable with a liquid supply basin, a vent tube fixedly mounted centrally of said bore and having a lower end head and a vent passage extending from beneath said head to a point above the liquid in said basin, and a tubular member having its upper portion slidable within said casing bore and being provided at its lower end with a flexible disc normally sealingly engageable with said end head and also normally sealingly cooperable with successive bottles to expose the receptacles to atmosphere through said passage, said disc being removable from said member to release the latter for removal from said bore and the member being removable from the bore only after removal of the disc.

3. Receptacle filling apparatus comprising, a normally fixed casing having a bore, a normally fixed vent tube disposed coaxial with said bore and being provided with an end head beneath said bore and with a vent passage extending upwardly from beneath said head, and a tubular member slidably engaging said bore and having a flexible flange of smaller internal diameter than the external head diameter sealingly engageable with said head, said flange normally coacting with said head to arrest the downward movement of said member but being distortable over the head to permit free downward removal of the member.

4. Receptacle filling apparatus comprising, a normally fixed casing having a bore, a normally fixed tube disposed coaxial with said bore and being provided with a lower end head beneath said bore and with a vent passage extending upwardly from below said head, a tubular member slidably engaging said bore and having a flexible stop flange engageable with said head, and a spring coacting with said casing and member to urge said flange toward said head, said flange normally coacting with said head to arrest the downward movement of said member and being distortable over the head to permit free downward removal of the member and spring and said member and spring being thus removable only after such distortion and removal of the flange.

5. Receptacle filling apparatus comprising, a normally fixed casing having an upright bore, a normally fixed elongated upright tube disposed coaxial with said bore and being provided with a lower end head having a rigid outwardly projecting flange and also being provided with a vent passage extending upwardly from beneath said flange, and a tubular member slidably engaging said casing bore and having an internal bore of larger diameter than said head, said member being provided with a flexible lower flange projecting inwardly beyond the periphery of said head flange and said flanges normally engaging each other to arrest the downward movement of said member but being relatively distortable to permit stretching of said flexible flange over the head flange and to effect free downward removal of the member over the head.

6. Receptacle filling apparatus comprising, a normally fixed casing having an upright bore, a normally fixed vent tube disposed coaxial with said bore and being provided with a rigid lower end head and with a vent passage extending upwardly from said head, a tubular member slidably engaging said casing bore and having an internal bore of larger diameter than said head, said member being provided with a flexible lower flange projecting inwardly beyond its internal bore and sealingly engaging said head, and said flange normally engaging said head to arrest the downward movement of said member but being distortable over the head to effect free downward removal of the member over the head and upward removal of said tube through said bore.

7. Receptacle filling apparatus comprising, a casing having a bore, a vent tube detachably secured to said casing centrally of said bore and having an end head and a piston at its lower and upper ends respectively, and a tubular sealing member slidable within said bore and having a flexible disc at its lower end cooperable with said head and a cylinder at its upper end cooperable with said piston, said member and cylinder being removable from said vent tube, and the latter being removable from said casing only after removal of the sealing member.

8. Receptacle filling apparatus comprising, a casing having a bore, a tubular seating member slidable within said bore, and a vent tube having a retainer plate detachably cooperable with a recess in said casing to fixedly mount the tube centrally of said member, said tube having a flange at its lower end sealingly cooperable with said member, and said member having an annular flexible sealing ring of smaller internal diameter than the periphery of said flange distortable over said flange to release said tube for removal from said casing.

9. A receptacle filler comprising, a casing having a bore, a normally fixed vent tube detachably secured to said casing within said bore and having a lower end head and an upper piston, and a tubular sealing member slidable within said bore and having a removable flexible seating disc at its lower end cooperable with said head and a cylinder at its upper end slidably cooperable with said piston, said member and cylinder being removable from said tube and the latter being removable from said casing only after said disc has been removed from the member.

10. A receptacle filler comprising, a tubular casing, a normally fixed vent tube detachably secured within said casing, a tubular sealing member slidable along said casing and tube and having a removable flexible seating disc cooperable with the lower end of said tube and a cylinder slidably cooperable with the upper tube end, said member and cylinder being removable from said tube and the latter being removable from said casing only after said disc has been removed from the member.

11. A receptacle filler comprising, a casing having a bore, a normally fixed vent tube secured to said casing within said bore and having a lower end head and an upper piston, and a tubular member slidable within said bore and having a sealing disc at its lower end cooperable with said head and a cylinder at its upper end slidably cooperable with said piston, said cylinder being cooperable with said piston to initially reduce the pressure within said tube below atmospheric pressure when a receptacle is first applied to said disc and to thereafter establish atmospheric pressure within the vent tube.

12. A receptacle filler comprising, a tubular casing, a normally fixed vent tube detachably secured to said casing, a tubular sealing member slidable along said casing and tube and having a sealing disc cooperable with the lower end of said tube and a cylinder slidably cooperable with the upper tube end, said cylinder coacting with said upper tube end to initially reduce the pressure within said tube below atmospheric pressure when a receptacle is first applied to said disc and to thereafter admit atmospheric pressure to the upper end of the vent tube.

13. A receptacle filler comprising, a casing having a bore, a normally fixed vent tube detachably secured to said casing within said bore and having a lower end head and an upper piston, and a tubular sealing member slidable along said tube within said casing and having a removable flexible seating disc at its lower end cooperable with said head and a cylinder at its upper end slidably cooperable with said piston, said member and cylinder being removable from said tube only after said disc has been removed from the member.

14. A receptacle filler comprising, a tubular casing, a normally fixed vent tube detachably secured within said casing, a tubular sealing member slidable along said tube and having a removable flexible seating disc cooperable with the lower end of said tube and a cylinder slidably cooperable with the upper tube end, said member and cylinder being removable from said tube only after said disc has been removed from the member.

15. A receptacle filler comprising, a casing having a bore, a normally fixed vent tube detachably secured to said casing within said bore and having a lower end head and an upper piston, and a tubular sealing member slidable along said tube within said casing and having a removable flexible seating disc at its lower end cooperable with said head and a cylinder at its upper end slidably cooperable with said piston, said member and cylinder being removable from said casing only after said disc has been removed from the member.

16. A receptacle filler comprising, a tubular casing, a normally fixed vent tube detachably secured within said casing, a tubular sealing member slidable along said tube and having a removable flexible seating disc cooperable with the lower end of said tube and a cylinder slidably cooperable with the upper tube end, said member and cylinder being removable from said casing only after said disc has been removed from the member.

JOHN B. McCABE.

REFERENCES CITED

The following references are of record in the file of this patent:

UNITED STATES PATENTS

| Number | Name | Date |
|--------|------|------|
| 668,303 | Beyer | Feb. 19, 1901 |
| 1,550,726 | Larsen | Aug. 25, 1925 |
| 1,978,002 | Weaver | Oct. 23, 1934 |
| 2,154,583 | Rogers | Apr. 18, 1939 |

FOREIGN PATENTS

| Number | Country | Date |
|--------|---------|------|
| 453,984 | Great Britain | Sept. 22, 1936 |